(12) United States Patent
Ohtsuka et al.

(10) Patent No.: US 9,325,015 B2
(45) Date of Patent: Apr. 26, 2016

(54) REACTION LAYER FOR FUEL CELL

(75) Inventors: Motohiro Ohtsuka, Tokyo (JP); Hidemi Katou, Tokyo (JP); Taizou Yamamoto, Tokyo (JP)

(73) Assignee: KABUSHIKIKAISHA EQUOS RESEARCH, Tokyo (JP)

( * ) Notice: Subject to any disclaimer, the term of this patent is extended or adjusted under 35 U.S.C. 154(b) by 1154 days.

(21) Appl. No.: 13/381,172

(22) PCT Filed: Jun. 29, 2010

(86) PCT No.: PCT/JP2010/061067
§ 371 (c)(1),
(2), (4) Date: Mar. 28, 2012

(87) PCT Pub. No.: WO2011/001981
PCT Pub. Date: Jan. 6, 2011

(65) Prior Publication Data
US 2012/0178014 A1 Jul. 12, 2012

(30) Foreign Application Priority Data

Jun. 29, 2009 (JP) ................. 2009-153546
Mar. 29, 2010 (JP) ................. 2010-074064
Mar. 31, 2010 (JP) ................. 2010-083384
Mar. 31, 2010 (JP) ................. 2010-083391
Mar. 31, 2010 (JP) ................. 2010-083431

(51) Int. Cl.
H01M 4/86 (2006.01)
H01M 8/10 (2006.01)
H01M 8/04 (2016.01)

(52) U.S. Cl.
CPC ............ *H01M 4/8605* (2013.01); *H01M 4/861* (2013.01); *H01M 4/8636* (2013.01); *H01M 4/8642* (2013.01); *H01M 4/8657* (2013.01);

(Continued)

(58) Field of Classification Search
CPC . H01M 4/8605; H01M 4/861; H01M 4/8636; H01M 4/8642; H01M 4/8657; H01M 8/04119; H01M 2008/1095; Y02E 60/50
See application file for complete search history.

(56) References Cited

U.S. PATENT DOCUMENTS 5,882,810 A * 3/1999 Mussell et al. ................. 429/483
2007/0213203 A1* 9/2007 Sompalli et al. ............... 502/101
2008/0241641 A1* 10/2008 Kurita et al. .................... 429/40

(Continued)

FOREIGN PATENT DOCUMENTS

JP 2002-015743 A 1/2002
JP 2002-164057 A 6/2002

(Continued)

OTHER PUBLICATIONS

Machine translation of Japanese Patent Document JP 2008-153052, published Jul. 3, 2008.*

*Primary Examiner* — Carlos Barcena
*Assistant Examiner* — Lilia V Nedialkova
(74) *Attorney, Agent, or Firm* — Bacon & Thomas, PLLC

(57) ABSTRACT

A reaction layer for a fuel cell, which is interposed between a solid electrolyte membrane and a diffusion layer in the fuel cell, the reaction layer including a first layer that is in contact with the solid electrolyte membrane, a second layer that is in contact with the diffusion layer; and an intermediate layer that is interposed between the first layer and the second layer, wherein the first layer and the second layer have a catalyst supported by an electrically conductive support, and the intermediate layer has no catalyst.

3 Claims, 6 Drawing Sheets

(52) U.S. Cl.
CPC .. *H01M 8/04119* (2013.01); *H01M 2008/1095* (2013.01); *Y02E 60/50* (2013.01)

(56) References Cited

U.S. PATENT DOCUMENTS

2009/0239116 A1* 9/2009 Okumura et al. ............... 429/30
2010/0075203 A1* 3/2010 Braeuninger et al. .......... 429/40

FOREIGN PATENT DOCUMENTS

| JP | 2008-153052 A | 1/2008 |
| JP | 2008-243453 A | 10/2008 |
| JP | 2009-021228 A | 1/2009 |
| JP | 2010-021056 A | 1/2010 |
| WO | WO 2008013293 A1 * | 1/2008 |
| WO | WO 2008040623 A1 * | 4/2008 |

* cited by examiner

F I G . 1
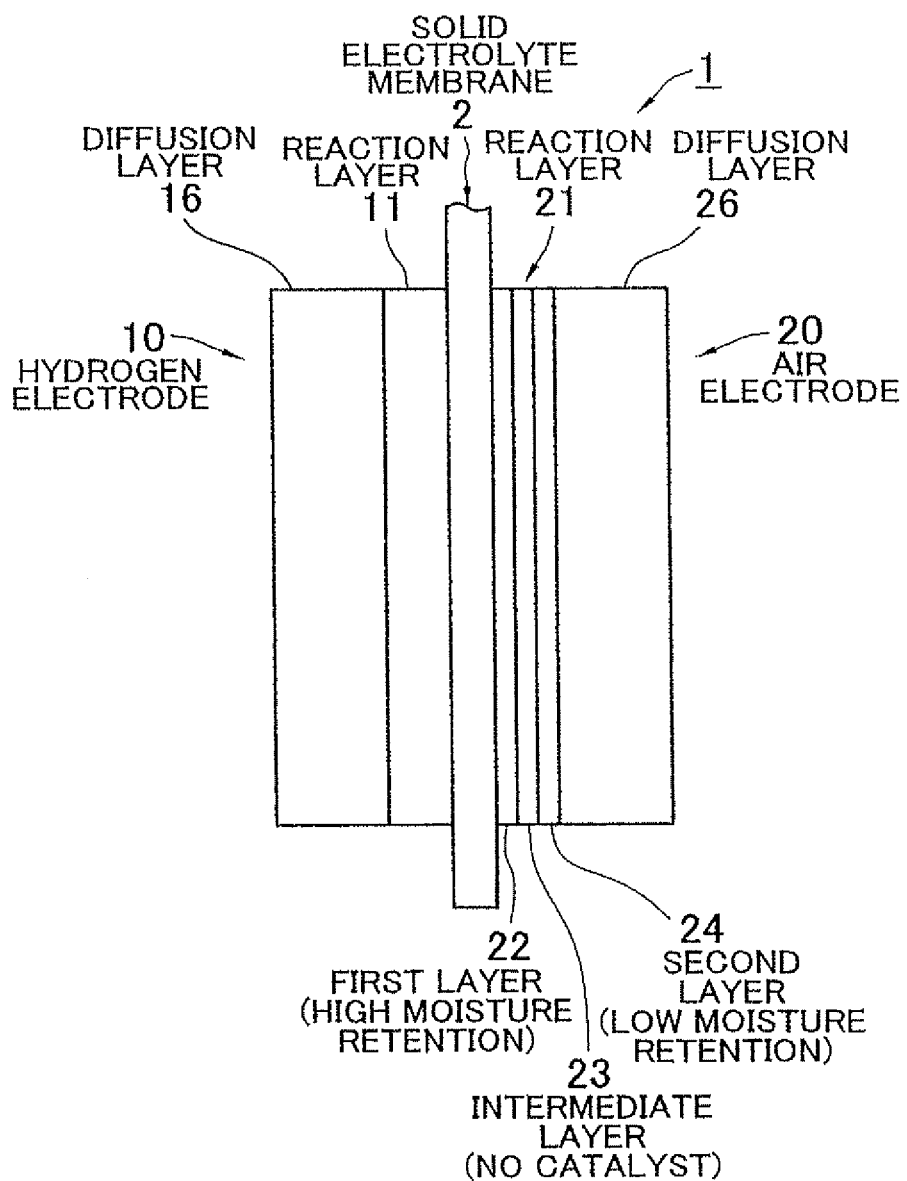

I-V PERFORMANCES IN LOW HUMIDITY

I-V PERFORMANCES IN HIGH HUMIDITY

I-V CHARACTERISTICS IN LOW HUMIDITY

I-V CHARACTERISTICS IN HIGH HUMIDITY

REACTION LAYER FOR FUEL CELL

TECHNICAL FIELD

The present invention relates to a reaction layer for a fuel cell.

BACKGROUND ART

Conventionally in a fuel cell device, a humidifier is arranged in an air supply system, and a moisture condition of a solid electrolyte membrane and a reaction layer (hereinafter may be referred to as "membrane electrode assembly") is regulated by adjusting humidity of process air. However, from the viewpoint of improvement in efficiency required for current fuel cells, auxiliaries such as the humidifier tend to be removed from the fuel cell device. In that case, the moisture condition of the membrane electrode assembly may not be able to be always maintained at an appropriate level corresponding to an operating environment of the fuel cell.

For example, when the fuel cell is operated under a low humidified environment, the membrane electrode assembly is placed in a dry condition to have a reduced proton conductivity, and thereby cannot exhibit a sufficient power generation property. By contrast, when the fuel cell is operated under a highly humidified environment, so-called flooding occurs to degrade the power generation property.

In order to avoid such phenomena, there is proposed a technology in which a reaction layer has a two-layer structure, and a first layer on the side of a solid electrolyte membrane has a high moisture retention capacity whereas a second layer on the side of a diffusion layer has a low moisture retention capacity (high water discharge capacity and high air permeability) (refer to Patent Document 1).

With this arrangement, the first layer is maintained in a wet condition even under the low humidified environment, and water accumulated under the highly humidified environment is efficiently discharged from the second layer.

Refer to Patent Documents 2 to 5 as documents introducing technologies related to the present invention.

RELATED ART DOCUMENT

Patent Document

Patent Document 1: Japanese Patent Application Publication No. 2004-192950
Patent Document 2: Japanese Patent Application Publication No. 2009-272052
Patent Document 3: Japanese Patent Application Publication No. 9-245802
Patent Document 4: Japanese Patent Application Publication No. 2007-26719
Patent Document 5: Japanese Patent Application Publication No. 2007-123235

DISCLOSURE OF THE INVENTION

Problem to be Solved by the Invention

However, in the configuration described above, the first layer and the second layer are continuously formed. Therefore, under the low humidified environment, the water that should essentially be retained in the first layer diffuses into the second layer in a relatively dry state, whereby the proton conductivity may be reduced.

Means for Solving the Problem

In order to solve the above-described problem, the inventors of the present invention have repeatedly made eager studies, and as a result, have devised a configuration in which an intermediate layer having no catalyst is interposed between the first layer and the second layer. That is, a first aspect of the present invention is defined as follows.

A reaction layer for a fuel cell is interposed between a solid electrolyte membrane and a diffusion layer in the fuel cell. The reaction layer is characterized by including a first layer that is in contact with the solid electrolyte membrane, a second layer that is in contact with the diffusion layer, and an intermediate layer that is interposed between the first layer and the second layer. In the reaction layer, the first layer and the second layer have a catalyst supported by an electrically conductive support, and the intermediate layer has no catalyst.

With the reaction layer for a fuel cell of the first aspect as defined above, generated water in the first layer in which power generation mainly occurs under a low humidified environment hardly diffuses into the second layer, and can thereby be suppressed from being carried away by gas. This is considered to be because the intermediate layer physically separates the first layer from the second layer, and thus, a diffusion distance increases. As a result, only the electrolyte membrane and the first layer are maintained in a wet condition, and thus, high performance is exhibited even under the low-humidity environment.

By contrast, under a highly humidified environment, excess generated water diffuses into the intermediate layer. Therefore, the flooding is prevented from occurring in the first layer.

A second aspect of the present invention is defined as follows. That is, in the reaction layer for a fuel cell as defined in the first aspect, the first layer has a moisture retention capacity higher than a moisture retention capacity of the second layer.

With the reaction layer for a fuel cell of the second aspect as defined above, the first layer that solely contributes to a fuel cell reaction under the low humidified environment is made to have a high moisture retention capacity, whereby the water in the first layer is retained more securely. In addition, the second layer that solely contributes to the fuel cell reaction under the highly humidified environment is made to have a low moisture retention capacity, whereby the second layer is more securely prevented from being flooded.

A third aspect of the present invention is defined as follows. That is, in the reaction layer for a fuel cell as defined in the second aspect, the intermediate layer has a moisture retention capacity lower than the moisture retention capacity of the first layer and higher than the moisture retention capacity of the second layer.

With the reaction layer of the third aspect as defined above, the intermediate layer more securely functions as a buffer layer.

As described above, it is preferable that the intermediate layer have no catalyst, and have a moisture retention capacity different from those of the first layer and the second layer.

A fourth aspect of the present invention is defined as follows. That is, in the reaction layer for a fuel cell as defined in the second aspect, the intermediate layer includes a 3-1 layer that is in contact with the first layer, a 3-2 layer that is in contact with the second layer, and a 3-3 layer that is sandwiched between the 3-1 layer and the 3-2 layer; the 3-1 layer has a moisture retention capacity equal to or lower than the moisture retention capacity of the first layer and higher than a moisture retention capacity of the 3-2 layer; the 3-2 layer has the moisture retention capacity equal to or higher than the moisture retention capacity of the second layer; and the 3-3 layer has a moisture retention capacity higher than the moisture retention capacities of the 3-1 layer and the 3-2 layer.

The intermediate layer as defined above has a high moisture retention capacity in the central layer thereof, and thereby exhibits an excellent performance as a reaction layer for a fuel cell. For example, under the low humidified environment, the generated water produced in the first layer is absorbed (trapped) in the 3-3 layer that has a high moisture retention capacity, whereby the generated water is prevented from moving into the layers on the outside of the 3-3 layer (the 3-2 layer and the second layer, that is, the layers on the diffusion layer side). These layers on the outside are prone to be affected by gas flow in the diffusion layer, that is, prone to have the generated water carried away. Therefore, by trapping the generated water in the 3-3 layer, the first layer is prevented from being overdried under the low humidified environment, whereby a high efficiency of the fuel cell reaction therein is ensured.

In the fourth aspect, it is preferable that the 3-1 layer have the same properties as properties of the first layer except that the 3-1 layer has no catalyst, and the 3-2 layer have the same properties as properties of the second layer except that the 3-2 layer has no catalyst (fifth aspect). For example, the 3-1 layer and the first layer are composed of carbon particles of the same pore diameter (first pore diameter) as each other, and the 3-2 layer and the second layer are also composed of carbon particles of the same pore diameter (second pore diameter) as each other. The water moves more smoothly between the layers having the same pore diameter as each other than in the case in which the pore diameter of carbon particles forming the 3-1 layer differs from the pore diameter of carbon particles forming the first layer. The water also moves smoothly between the 3-2 layer and the second layer by giving the same pore diameter to those layers, thereby facilitating to prevent the flooding under the highly humidified environment.

A sixth aspect of the present invention is defined as follows. That is, in the reaction layer for a fuel cell as defined in any one of the first to fifth aspects, the first layer has a lower porosity ratio of the support, a higher ratio of an electrolyte, a higher supporting density of the catalyst, or a lower equivalent weight (EW) of the electrolyte, compared with the second layer.

The above-described sixth aspect lists the specific methods for adjusting the moisture retention capacity. The moisture retention capacity of each layer can be controlled in a low-cost and secure manner by employing such methods.

The first layer and the second layer will be studied from the viewpoint of a catalyst-supporting ratio.

From the viewpoint of popularization of the fuel cell, it is particularly desired to reduce the amount of use of expensive catalytic metal particles.

In general, a large amount of the catalytic metal particles are used in the reaction layer on the side of an air electrode. The reaction layer is formed by kneading the support (such as electrically conductive carbon black particles) that supports the catalytic metal particles with the electrolyte.

The inventors of the present invention have repeatedly made eager studies to reduce the amount of use of the catalytic metal in the reaction layer on the air electrode side into which the large amount of the catalytic metal particles are blended.

It has been found that the following problem occurs when the amount of use of the catalytic metal particles is reduced, that is, when a blending ratio of the catalytic metal particles to the support is reduced.

The fuel cell is required to have a high output property even after the catalytic metal particles are reduced. This means that each one of the catalytic metal particles is required to have a high performance. For example, if the output property of the fuel cell is to be maintained after the amount of use of the catalytic metal particles is reduced to a quarter, each of the catalytic metal particles is to be involved in a four times larger amount of cell reaction. As a result, a four times larger amount of generated water is to be produced from each of the catalytic metal particles.

Because this generated water has an influence on operation of the fuel cell, countermeasures to the influence are required.

It is an object of other aspects of the present invention to allow the fuel cell to exhibit a sufficient output property even after the amount of use of the catalytic metal particles is reduced in the reaction layer on the air electrode side. The inventors of the present invention have found that countermeasures to the water in the reaction layer have a large influence on the output property of the fuel cell when the fuel cell is operated with a small amount of the catalytic metal particles. Thus, the inventors have completed the present invention.

That is, another aspect 1-1 of the present invention is defined as follows.

A reaction layer for a fuel cell on an air electrode side is interposed between a solid electrolyte membrane and a diffusion layer in the fuel cell. The reaction layer is characterized by including a first layer that is in contact with the solid electrolyte membrane, a second layer that is in contact with the diffusion layer, and an intermediate layer that is interposed between the first layer and the second layer. In the reaction layer, the first layer and the second layer have a catalyst supported by an electrically conductive support with a catalyst-supporting ratio higher in the first layer than in the second layer, and the intermediate layer has no catalyst.

In the fuel cell, because the entire reaction layer dries when operation continues under the low humidified environment, the rate of the fuel cell reaction in the reaction layer is determined by proton transfer. Accordingly, a part on the solid electrolyte membrane side mainly works in the reaction layer. By contrast, because the entire reaction layer is saturated with water under the highly humidified environment, the rate of the fuel cell reaction in the reaction layer is determined by diffusion of oxygen. Accordingly, a part on the diffusion layer side mainly works in the reaction layer.

Therefore, in the present invention, the part on the solid electrolyte membrane side and the part on the diffusion layer side are separated by the intermediate layer, and have different amounts of supported catalytic metal particles from each other. The first layer on the solid electrolyte membrane side has a high supporting ratio of the catalytic metal particles so that the wet condition of the first layer can easily be maintained even under the low humidified environment. Accordingly, the first layer sufficiently contributes to the fuel cell reaction under the low humidified environment. By contrast, the second layer on the diffusion layer side has a low supporting ratio of the catalytic metal particles. This can achieve an effect of reduction in the amount of use of the catalytic metal particles. In addition, the low supporting ratio of the catalytic metal particles increases distances between the catalytic metal particles that serve as a water generation source, and thereby prevents the flooding from occurring so as to ensure the diffusion of oxygen. Accordingly, the second layer sufficiently contributes to the fuel cell reaction under the highly humidified environment.

The first layer and the second layer are separated by the intermediate layer that does not have the catalytic metal particles. The intermediate layer physically separates the first layer from the second layer, and thus, the diffusion distance increases. Therefore, under the low humidified environment, the generated water in the first layer hardly diffuses into the second layer, and is thereby suppressed from being carried away by the gas flowing in the diffusion layer. In addition, under the highly humidified environment, because the water in the first layer diffuses into the intermediate layer, the flooding can be more securely prevented from occurring.

Another aspect 1-2 of the present invention is defined as follows. That is, the reaction layer for a fuel cell defined in the other aspect 1-1 described above is characterized in that the intermediate layer has water repellency higher than that of the first and the second layers.

With the reaction layer for a fuel cell of the other aspect 1-2 as defined above, the intermediate layer does not produce generated water by itself because the intermediate layer has no catalyst, and also facilitates separation of the water in the first layer from water in the second layer because the intermediate layer has the high water repellency. As a result, the wet condition of the electrolyte membrane and the first layer is maintained, and thus, high performance is exhibited even under the low humidified environment.

By contrast, under the highly humidified environment, the generated water excessively produced in the first layer has a pressure, which allows the generated water to pass through the intermediate layer easily. The water after having passed through the intermediate layer is prevented from flowing back by the water repellency of the intermediate layer. Accordingly, the flooding can be more securely prevented from occurring in the first layer.

The first layer and the second layer will be studied from the viewpoint of selection and durability of the catalytic metal particles.

In Patent Document 2, the reaction layer has a multilayer structure, in which a first layer that is in contact with an electrolyte membrane has a predetermined film thickness, and a catalyst supported in the first layer has a high durability. In order to enhance the durability of the catalyst, catalytic metal particles having a large particle diameter are employed.

The catalytic metal particles having a large diameter certainly has a high durability. However, if the catalytic metal particles having a larger diameter are used, a surface area per unit weight becomes smaller. Therefore, in order to obtain a predetermined catalytic activity, the amount of use (weight) increases compared with the case in which the catalytic metal particles having a small diameter are supported. In addition, because the catalytic metal particles are expensive material, the increase in the amount of use increases the production cost of the reaction layer, and eventually, of the fuel cell.

Therefore, it is an object of the present invention to ensure a high output and a high durability of the fuel cell without causing an increase in the amount of use (weight) of the catalytic metal particles.

In general, it is known that, when the fuel cell is operated for a long time, the catalytic metal particles become detached from the reaction layer and move to the solid electrolyte membrane. This is considered to be because the generated water in the reaction layer is prone to accumulate in a part on the side nearer to the solid electrolyte membrane so as to increase a proton conductivity level in that part, and as a result, the reaction layer in that part is subjected to a corrosive action. In the reaction layer, the corrosive action affects not only the catalytic metal particles but also the support.

The inventors of the present invention have focused on the support, and have come to contrive the present invention. That is, another aspect 2-1 of the present invention is defined as follows.

A reaction layer for a fuel cell on an air electrode side is interposed between a solid electrolyte membrane and a diffusion layer in the fuel cell. The reaction layer is characterized by including a first layer that is in contact with the solid electrolyte membrane and a second layer that is in contact with the diffusion layer. In the reaction layer, a first support of the first layer is a material different from a second support of the second layer, and the first support has a higher durability than a durability of the second support.

According to the invention of the other aspect 2-1 as defined above, the part (first layer) of the reaction layer closer to the solid electrolyte membrane is formed of the support (first support) having a high durability. Therefore, the reaction layer is hardly corroded even under a proton rich environment. Accordingly, the catalytic metal particles are supported in a stable manner. By this configuration, properties of the reaction layer can be maintained without particularly improving the durability of the catalytic metal particles themselves (without increasing the diameter of the catalyst particles).

Diamond-like carbon or glassy carbon may be employed as the first support such as described above (second aspect). Such materials have higher chemical and physical stabilities than those of carbon black particles that are widely used as a support.

Although there is no particular limitation on the support (second support) in the second layer that is located on the diffusion layer side in the reaction layer, it is preferable to use the widely used carbon black particles, from the viewpoint of a water discharge property under the highly humidified environment, and cost of material. It is also preferable that the second support have a higher water discharge property (lower moisture retention capacity) than that of the first support.

Moreover, it is preferable to interpose an intermediate layer between the first layer and the second layer. This intermediate layer is made of carbon black particles (preferably, the carbon black particles that are identical to or of the same type as those of the second support) coated with an electrolyte, and does not include catalytic metal particles.

By having the intermediate layer such as described above between the first layer and the second layer, the first layer and the second layer are physically separated by the intermediate layer, and thus, the diffusion distance increases. Therefore, under the low humidified environment, the generated water in the first layer hardly diffuses into the second layer, and is thereby suppressed from being carried away by the gas flowing in the diffusion layer. In addition, under the highly humidified environment, because the water in the first layer diffuses into the intermediate layer, the flooding can be more securely prevented from occurring.

Diamond-like carbon is used as the support (first support) in the first layer. Diamond-like carbon is an amorphous form of carbon. The diamond-like carbon used as the support in the present invention is in the form of electrically conductive fine particles. The diamond-like carbon supports the catalytic metal particles.

Fine particles of glassy carbon may also be used instead of the diamond-like carbon.

Commonly used carbon black particles can be employed as the support (second support) in the second layer. However, tin oxide and titanium oxides may also be used.

In the third aspect mentioned above, it is preferable that the intermediate layer provided between the first layer and the second layer have hydrophilicity different from those of the first layer and the second layer.

The property of the intermediate layer is described as follows from the viewpoint of water repellency.

Another aspect 3-1 of the present invention is defined as follows. That is, a reaction layer for a fuel cell is interposed between a solid electrolyte membrane and a diffusion layer in the fuel cell. The reaction layer is characterized by including a first layer that is in contact with the solid electrolyte membrane, a second layer that is in contact with the diffusion layer, and an intermediate layer that is interposed between the first layer and the second layer. In the reaction layer, the first layer and the second layer have catalytic metal particles while the intermediate layer has no catalytic metal particles and has water repellency higher than that of the first and the second layers.

In the fuel cell, because the entire reaction layer dries when operation continues under the low humidified environment, the rate of the fuel cell reaction in the reaction layer is determined by proton transfer. Accordingly, the part on the solid electrolyte membrane side mainly works in the reaction layer. By contrast, because the entire reaction layer is saturated with water under the highly humidified environment, the rate of the fuel cell reaction in the reaction layer is determined by diffusion of oxygen. Accordingly, the part on the diffusion layer side mainly works in the reaction layer. Under the highly humidified environment, it is also important to prevent the flooding.

Therefore, in the present invention, the part (first layer) on the solid electrolyte membrane side and the part (second layer) on the diffusion layer side are separated by the intermediate layer, and the intermediate layer is cleared of the catalytic metal particles and provided with high water repellency.

The first layer and the second layer are separated by the intermediate layer that does not have the catalytic metal particles. The intermediate layer physically separates the first layer from the second layer, and thus, the diffusion distance increases. Therefore, under the low humidified environment, the generated water in the first layer hardly diffuses into the second layer, and is thereby suppressed from being carried away by the gas flowing in the diffusion layer. In addition, because the inter mediate layer has the high water repellency, separation of the water in the first layer from water in the second layer is facilitated. As a result, under the low humidified environment, the wet condition is maintained in the first layer that determines the rate of the fuel cell reaction, and thus, the performance of the fuel cell under the low humidified environment is stabilized.

By contrast, under the highly humidified environment, even in the presence of the intermediate layer separating the first layer from the second layer, the generated water excessively produced in the first layer has a pressure, which in turn allows the generated water to pass through the intermediate layer easily. The water after having passed through the intermediate layer is prevented from flowing back by the water repellency of the intermediate layer. Accordingly, the flooding can be more securely prevented from occurring in the first layer.

Another aspect 3-2 of the present invention is defined as follows. That is, in the reaction layer for a fuel cell as defined in the first aspect, the first layer has a higher moisture retention capacity than that of the second layer.

With the reaction layer for a fuel cell of the second aspect as defined above, the first layer having a higher moisture retention capacity and the second layer having a lower moisture retention capacity are separated by the intermediate layer that has no catalyst and has high water repellency. The first layer that determines the rate of reaction of the fuel cell when operated under the low humidified environment has a moisture retention capacity that is set to be high. Therefore, the wet condition of the first layer is maintained. Consequently, the operation of the fuel cell under the low humidified environment is stabilized.

When the fuel cell is operated under the highly humidified environment, the moisture retention capacity of the second layer is set to be low so that the water can easily be carried away therefrom. As a result, the water is facilitated to move from the first layer to the second layer, thus effectively preventing the flooding from occurring in the first layer.

BRIEF DESCRIPTION OF THE DRAWINGS

FIG. 1 is a cross-sectional view of a fuel cell 1 showing an embodiment of the present invention.

BEST MODES FOR CARRYING OUT THE INVENTION

Figure 2:
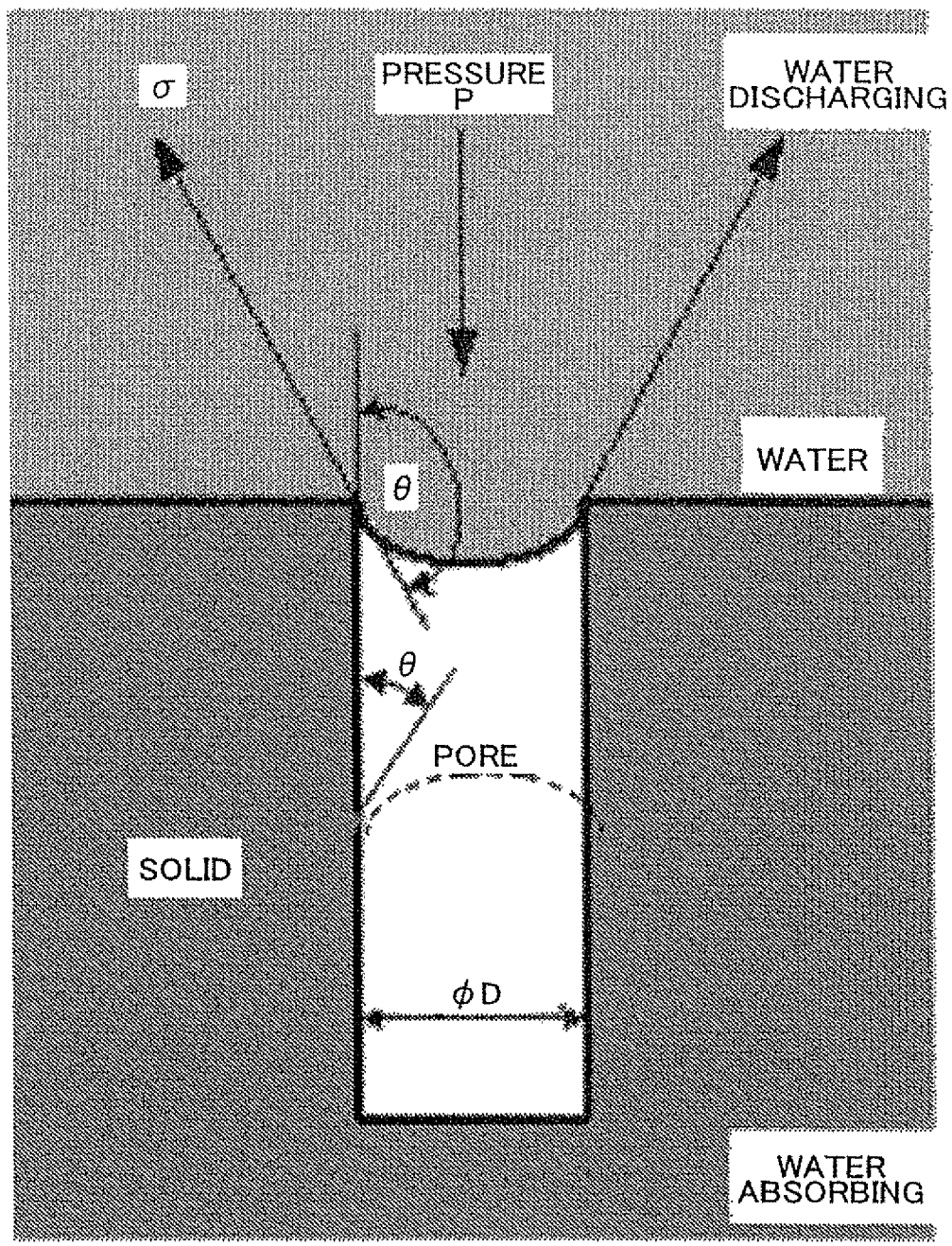
FIG. 2 is a conceptual diagram showing a relationship between a diameter D of a pore and a water absorption property or a water discharge property (pressure P).

FIG. 1 shows a fuel cell 1 of an embodiment of the present invention.

The fuel cell 1 has a configuration in which a solid electrolyte membrane 2 is sandwiched between a hydrogen electrode 10 and an air electrode 20.

For the solid electrolyte membrane 2, a proton-conductive polymer material, for example, a fluorine-containing polymer such as Nation (registered trademark of DuPont; hereinafter the same shall apply), may be used.

The hydrogen electrode 10 is provided with a reaction layer 11 and a diffusion layer 16, which are stacked on the solid electrolyte membrane 2. The reaction layer 11 is a layer in which a catalyst such as Pt is supported by an electrically conductive support such as carbon particles and coated with an electrolyte. The diffusion layer 16 is formed of a material, such as carbon paper, carbon cloth, or carbon felt, that has electrical conductivity and gas diffusion performance.

The air electrode 20 is also provided with a reaction layer 21 and a diffusion layer 26. The reaction layer 21 and the diffusion layer 26 have the same basic structures as those of the hydrogen electrode 10.

In the present invention, as shown in FIG. 1, the reaction layer 21 of the air electrode 20 is configured such that a first layer 22, an intermediate layer 23, and a second layer 24 are stacked from the side of the solid electrolyte membrane 2.

Both the first layer 22 and the second layer 24 have a catalyst supported on a support. No catalyst is supported in the intermediate layer 23.

A general-purpose catalyst such as a platinum or platinum-cobalt alloy may be employed for catalytic metal particles supported in the first layer 22 and the second layer 24. The catalytic metal particles supported in the first layer 22 and the catalytic metal particles supported in the second layer 24 may be the same as each other or different from each other.

Although the intermediate layer 23 has no catalyst, the intermediate layer 23 is required to have electrical conductivity, proton mobility, and oxygen diffusivity in order to ensure activity of the catalysts in the first layer 22 and the second layer 24. For that purpose, the intermediate layer 23 is configured such that a base substance composed of electrically conductive porous fine particles is kneaded with an electrolyte. The above-mentioned support (such as carbon black particles) for the catalytic metal particles may be used as such a base substance. From the viewpoint of moving water smoothly, the base substance of the intermediate layer is preferable to be made of material that is identical to or of the same type as material of the support in the first and the second layers.

Any electrolyte can be selected as far as it allows protons to move.

The first layer 22 has a moisture retention capacity that is set to be higher than that of the second layer 24.

The moisture retention capacity of each of the layers can be controlled by controlling the properties of the base material, the electrolyte, and the catalyst.

For example, the moisture retention capacity is reduced by increasing the porosity ratio of the base material composed of the carbon particles. By the same token, the moisture retention capacity is reduced by enhancing water repellency of the support.

The moisture retention capacity is increased by increasing the blending ratio of the electrolyte. In addition, the moisture retention capacity is reduced by increasing the EW (dry weight per mole of sulfonic acid group) of the electrolyte.

Moreover, by increasing a supporting density of the catalytic metal, the reaction layer becomes thinner. Thus, a generation density of generated water increases, thereby enabling to prevent the layers from drying.

Furthermore, the moisture retention capacity can be kept high by employing a hydrophilic catalyst. Such a hydrophilic catalyst includes, as an example, a Pt—Co catalyst. The hydrophilicity of general-purpose catalysts including the Pt—Co catalyst can be improved by applying an acid treatment thereto.

The moisture retention capacity of the first layer 22 can be made higher than that of the second layer 24 by considering the above description, that is, by changing a property of at least one of the base material, the electrolyte, and the catalyst.

In order to obtain high performance under a low-humidity environment, it is important to suppress the generated water from being carried away so as to keep in a wet condition the electrolyte membrane and the reaction layer contributing to power generation that is located near the electrolyte membrane. Because the second layer 24 is near a gas passage, the generated water is likely to be carried away by the gas. Therefore, under the low-humidity environment, it is preferable not to allow the generated water to be produced, that is, not to allow power to be generated. Therefore, the intermediate layer 23 that includes no catalyst is provided between the first layer 22 near the electrolyte membrane and the second layer 24 near the passage so as to provide a structure that physically separates the first layer from the second layer. Accordingly, the generated water in the first layer hardly diffuses into the second layer because the first layer is separated in a distance from the second layer by the intermediate layer, and thus, an amount of water carried away by the gas can be reduced. As a result, only the electrolyte membrane and the first layer are kept in a wet condition, and thus, high performance is exhibited even under the low-humidity environment.

By contrast, in order to obtain high performance under a high-humidity environment, it is important to prevent pores from being blocked by the generated water so as to allow the entire reaction layer to generate power. Although the first layer 22 has a high moisture retention capacity, if the intermediate layer is provided, excess generated water diffuses into the intermediate layer, and thus, flooding can be prevented from occurring in the first layer 22.

From the viewpoint of ensuring the effect described above, the intermediate layer 23 is preferable to have a thickness of approximately 0.1 to 10 μm. Although the intermediate layer 23 supports no catalyst, the catalyst may diffuse therein from the first layer 22 or the second layer 24 in the production process. Therefore, the definition of the intermediate layer includes a case in which such an unintended catalyst is present.

In the first layer 22, the supporting density of the catalytic metal particles can be set to a higher value than that in the second layer 24.

The supporting density of the catalytic metal particles can be adjusted by any method.

If the same support supports the same catalytic metal particles in both of the first layer 22 and the second layer 24, a weight ratio of the catalytic metal particles included in a unit volume in each of the layers can be regarded as an indicator of the supporting density.

If the first layer 22 and the second layer 24 use the catalytic metal particles having different particle diameters from each other, a surface area of the catalytic metal particles included in a unit volume can be regarded as the indicator.

Note that, when considering in the flow of a series of technological developments intended to reduce the amount of use of catalyst metal, the particle diameter of catalytic metal particles is preferable to be as small as possible. Accordingly, the catalytic metal particles to be supported in the first layer 22 and the second layer 24 are preferable to have as small diameter as possible, that is, to have the same particle diameter as each other.

The properties of the intermediate layer 23 are preferable to differ from those of the first layer 22 and the second layer 24. As described above, the water repellency, as one of the properties, of the intermediate layer 23 is preferable to be higher than the water repellency of the first layer 22 and the second layer 24.

As methods to enhance the water repellency of the intermediate layer 23, the following methods are exemplified: (1) to combine a hydrophilic group of the electrolyte with the base material so as to bring out a hydrophobic group of the electrolyte to a surface thereof, and/or (2) to reduce a pore diameter.

(1) To combine a hydrophilic group of the electrolyte phase with the base material so as to bring out a hydrophobic group of the electrolyte phase to the surface.

The water repellency of the intermediate layer is improved because the surface of the electrolyte phase becomes hydrophobic.

There are following methods to make the surface of the electrolyte phase hydrophobic.

(1-1) To make a specific surface area of the base material of the intermediate layer 23 larger than those of the base materials of the first and the second layers 22 and 24.

The carbon black particle serving as the base material has on a surface thereof a hydrophilic group, which combines with the hydrophilic group of the electrolyte by an electron affinity. As a result, the hydrophobic group is brought out to the surface of the electrolyte that covers the base material. At this time, more amount of the hydrophilic group in the electrolyte combines with the base material as the specific surface area of the base material is larger. Thus, a higher ratio of the hydrophobic group is brought out to the surface. Accordingly, the intermediate layer that is formed of a kneaded mixture of the base material and electrolyte is improved in the water repellency thereof.

(1-2) To make an electrolyte ratio [electrolyte/(base material+electrolyte)] of the intermediate layer 23 lower than those of the first and the second layers 22 and 24.

By making the electrolyte ratio lower, more amount of the hydrophilic group of the electrolyte combines with the base material, whereby a higher ratio of the hydrophobic group is brought out to the surface.

(1-3) To make the EW (dry weight per mole of sulfonic acid group) of the electrolyte of the intermediate layer 23 larger than those of the electrolytes of the first and the second layers 22 and 24.

The sulfonic acid group (hydrophilic group) of the electrolyte decreases in density as the EW increases. When an electrolyte of a large EW (electrolyte of a small sulfonic acid group density) is used, a large amount of the hydrophobic group is present on the surface of the electrolyte phase.

(2) FIG. 2 and formula 1 show a relationship between a diameter D of a pore in the base substance and a water absorption property or a water discharge property (pressure P).

$$P = -4\sigma \cos \theta / D \quad \text{Formula 1}$$

According to the formula 1, if a contact angle $\theta$ is 90° or more (water discharging), the water discharging pressure P is larger as the pore diameter D is smaller. (The case in which the contact angle $\theta$ is less than 90° is obviously out of the question. If the pore is blocked by absorbing water, oxygen supply is hampered.) Therefore, the base material of the intermediate layer 23 is preferable to have a smaller pore diameter than those of the base materials of the first and the second layers 22 and 24.

In addition, the intermediate layer 23 is formed in a film thickness that is smaller than those of the first and the second layers 22 and 24. The water-repellent intermediate layer 23 is formed thin so as not to be excessively resistant against movement of the generated water under the highly humidified environment.

In order to obtain high performance under the low humidified environment, it is important to suppress the generated water from being carried away by the gas flowing in the diffusion layer so as to keep in a wet condition the solid electrolyte membrane and the reaction layer contributing to power generation that is located near the solid electrolyte membrane. Therefore, the intermediate layer 23 that includes no catalyst and has high water repellency is provided between the first layer 22 near the solid electrolyte membrane and the second layer 24 near the gas passage so as to provide a structure that physically separates the first layer 22 from the second layer 24. Accordingly, the generated water in the first layer 22 is repelled by the intermediate layer 23, which has water repellency, and thus, hardly diffuses into the second layer 24. In other words, the water-repellent intermediate layer 23 shuts off the communication of water between the first layer 22 and the second layer 24. Therefore, although the second layer 24 progressively dries, the influence of the drying does not reach the first layer 22. Accordingly, the wet condition of the solid electrolyte membrane 2 and the first layer 22 is maintained, and thus, high performance is exhibited even under the low-humidity environment. Particularly, when the pores of the base material of the intermediate layer 23 are small, the water can be suppressed from evaporating from the first layer 22, and thus, the first layer 22 is effectively suppressed from being overdried.

By contrast, in order to obtain high performance under the highly humidified environment, it is important to prevent the pores from being blocked by the generated water so as to allow the entire reaction layer to generate power. If the generated water excessively increases in the first layer 22, a pressure (water pressure) is applied in the first layer 22. Accordingly, even though the intermediate layer 23 has higher water repellency, the generated water thus pressurized passes through it easily. By contrast, the water repellency of the intermediate layer 23 assures backflow prevention of the generated water that has passed through the intermediate layer 23. As a result, the water that has passed through the intermediate layer 23 is efficiently removed through the second layer 24. Therefore, flooding can be prevented from occurring in the first layer 22.

From the viewpoint of ensuring the effect described above, the intermediate layer 23 is preferable to have a thickness of approximately 0.1 to 10 μm. Although the intermediate layer 23 supports no catalyst, the catalyst may diffuse therein from the first layer 22 or the second layer 24 in the production process. Therefore, the definition of the intermediate layer includes a case in which such an unintended catalyst is present.

An example of the present invention will be described below.

The reaction layer 21 of the example is formed as follows.

First of all, pastes for the layers 22, 23, and 24 constituting the reaction layer 21 are prepared.

For the paste for the first layer 22, Ketjenblack EC600JD (registered trademark of Ketjen Black International Company; hereinafter the same shall apply) is used as a support, and a Pt—Co alloy as a catalyst is supported on the support at 50 wt %. Note that the molar ratio of Pt to Co is 1:3. For the electrolyte, a 5 wt % solution of Nafion is used. The weight ratio of the carbon support to the electrolyte is 1:1.

For the paste for the intermediate layer 23, Ketjenblack EC (registered trademark of Ketjen Black International Company; hereinafter the same shall apply) is used as a support, and dispersed in a 5% solution of Nafion. The weight ratio of the carbon support to the electrolyte is 1:1.

For the paste for the second layer 24, Ketjenblack EC600JD is used and a Pt catalyst is supported thereon at 60 wt %. For the electrolyte, a 5 wt % solution of Nation is used. The weight ratio of the carbon support to the electrolyte is 1:0.8.

In the above-described preparation, when comparing the first layer 22 with the second layer 24, the catalyst in the first layer 22 has a higher moisture retention capacity than that of the catalyst in the second layer 24. The blending ratio of the electrolyte to the base material is higher in the first layer 22 than in the second layer 24.

The pastes are stacked on the surface of the diffusion layer 26 sequentially in an order starting from the paste for the second layer 24, and are dried to form the reaction layer 21 shown in FIG. 1.

In the same manner, on the side of the hydrogen electrode 10 as well, the reaction layer 11 is stacked on the surface of the diffusion layer 16.

The reaction layers 11 and 21 of the hydrogen electrode 10 and the air electrode 20, respectively, are laminated on the solid electrolyte membrane 2 to form the fuel cell 1 of FIG. 1.

Figure 3:
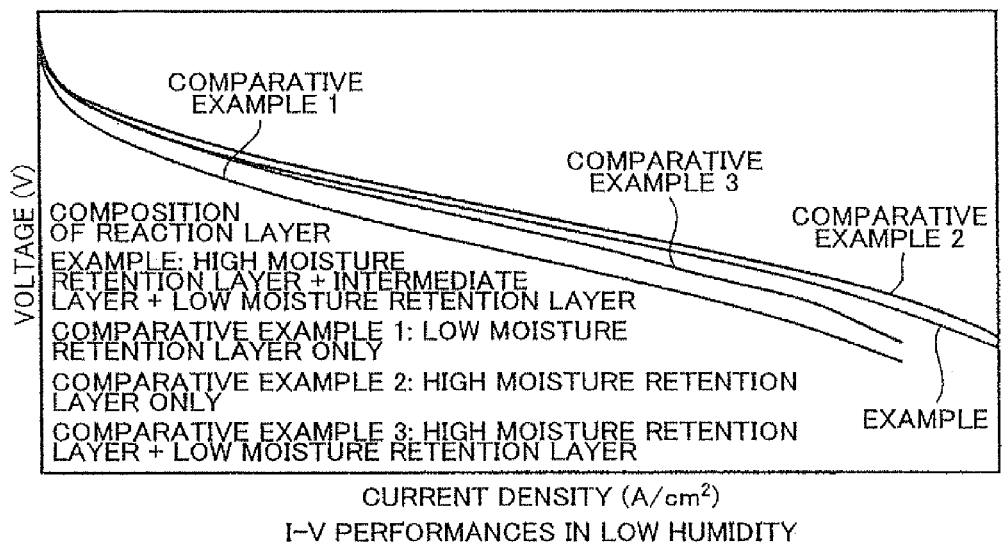
FIG. 3 shows operating characteristics of the fuel cell 1 under a low humidified environment.
Figure 4:
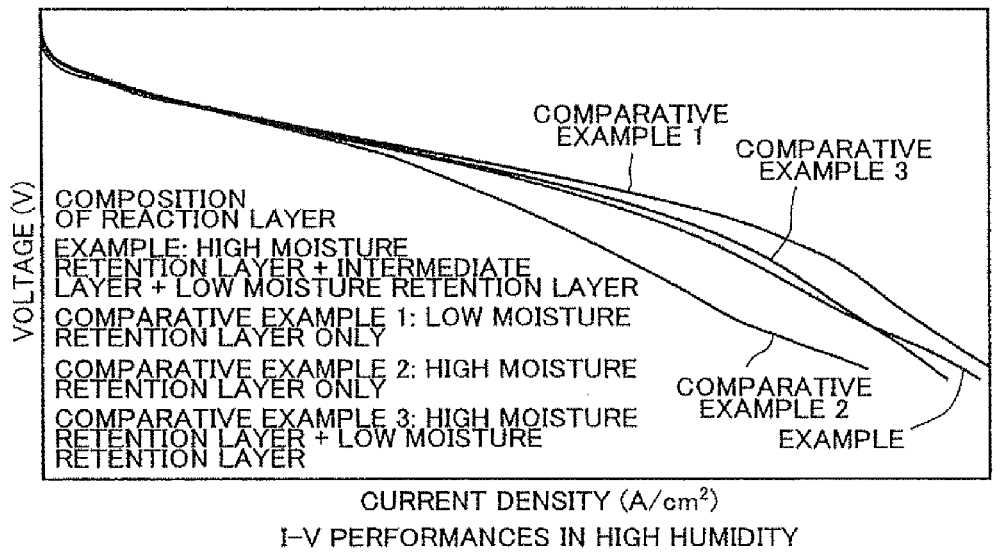
FIG. 4 shows the operating characteristics of the fuel cell 1 under a highly humidified environment.

FIG. 3 shows output properties of the fuel cell 1 thus obtained under the low humidified environment. In the same manner, FIG. 4 shows the output properties under the highly humidified environment. Note that a comparative example 1 is an example in which the entire reaction layer 21 is formed of the second layer 24 that has a low moisture retention capacity; a comparative example 2 is an example in which the entire reaction layer 21 is formed of the first layer 22 that has a high moisture retention capacity; and a comparative example 3 is an example in which the intermediate layer 23 is removed from, the reaction layer 21.

The low humidified environment in FIG. 3 is an environment in the case of using dry air as process air, and the highly humidified environment in FIG. 4 is an environment in the case of using humidified air as the process air.

From the results of FIGS. 3 and 4, it is found that, under both the low humidified environment and the highly humidified environment, excellent operating characteristics are exhibited by the fuel cell of the example in which the intermediate layer 23 having no catalyst is interposed between the first layer 22 having a high moisture retention capacity and the second layer 24 having a low moisture retention capacity.

Figure 5:
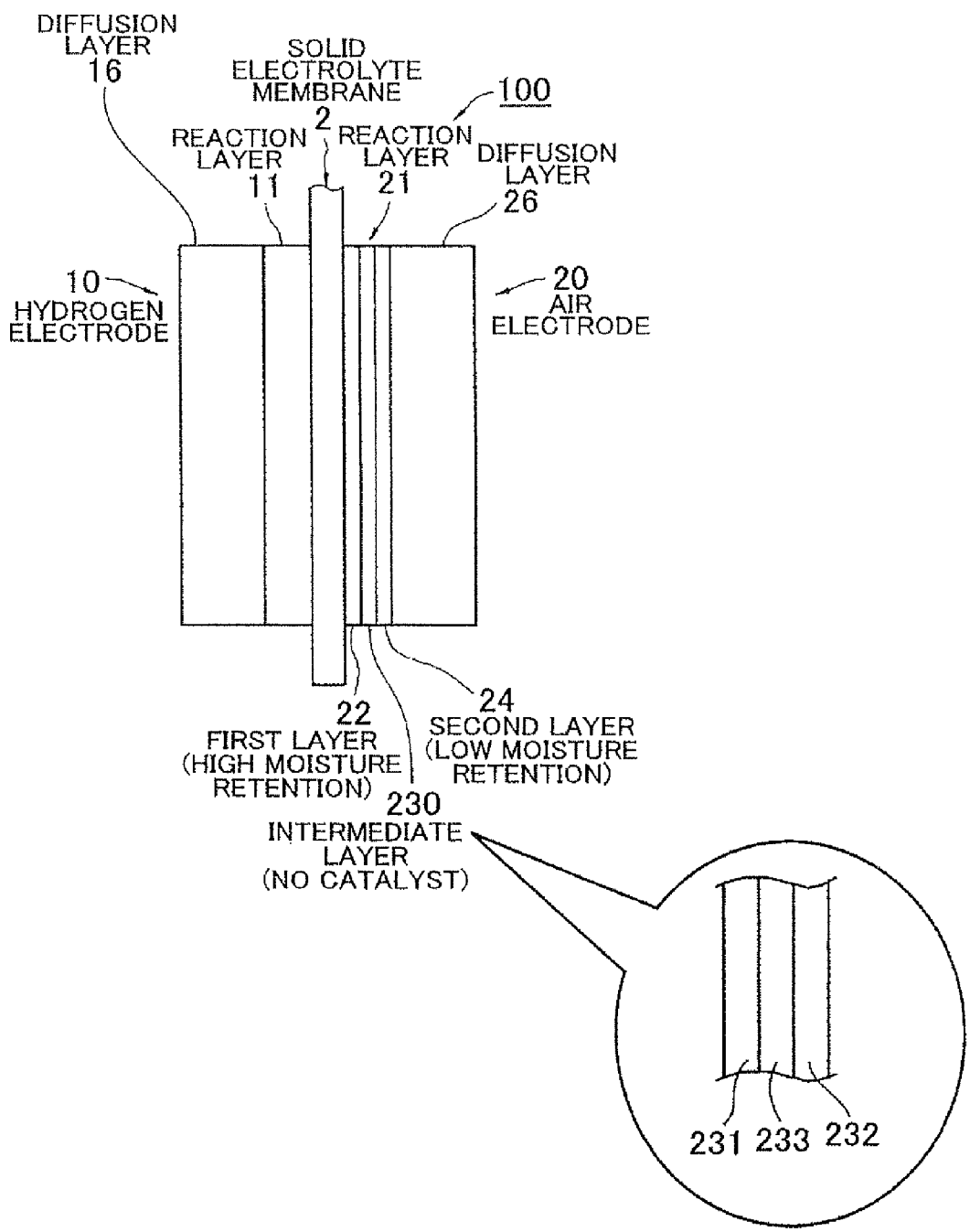
FIG. 5 is a conceptual diagram showing a configuration of a fuel cell 100 of a second example.

FIG. 5 shows a fuel cell 100 of an example 2. Note that the same reference numerals are assigned to the same elements as those shown in FIG. 1, and descriptions thereof will be omitted.

In the fuel cell 100, an intermediate layer 230 has a three-layer structure. The intermediate layer 230 is composed of a 3-1 layer 231 that is connected to the first layer 22 having a high moisture retention capacity, a 3-2 layer 232 that is connected to the second layer 24 having a low moisture retention capacity, and a 3-3 layer 233 that is sandwiched between the 3-1 layer 231 and the 3-2 layer 232.

The 3-1 layer 231 is the same as the first layer 22 except that the 3-1 layer 231 has no catalyst. That is, Ketjenblack EC600JD is mixed with Nation serving as an electrolyte, and the weight ratio of carbon to the electrolyte is 1:1. Accordingly, the 3-1 layer 231 has almost the same moisture retention capacity as that of the first layer 22.

The 3-2 layer 232 is the same as the second layer 24 except that the 3-2 layer 232 has no catalyst. That is, Ketjenblack EC600JD is mixed with Nafion serving as an electrolyte, and the weight ratio of carbon to the electrolyte is 1:0.8. Accordingly, the 3-2 layer 232 has almost the same moisture retention capacity as that of the second layer 24.

The 3-3 layer 233 has a higher moisture retention capacity than those of the 3-1 layer 231 and the 3-2 layer 232. Specifically, Ketjenblack EC600JD is mixed with titanium oxide and further with Nation serving as an electrolyte, and the weight ratio of carbon to the electrolyte is 1:1.1.

As a method to increase the high moisture retention capacity of the layer that has no catalyst, it is possible to use a method in which carbon is subjected to a heat treatment or an acid treatment so that the surface thereof is oxidized to be hydrophilic, instead of using the above-mentioned method in which hydrophilic material such as titanium oxide or silica gel is mixed. Moreover, the oxidation-treated carbon may be mixed with hydrophilic material. Furthermore, electrically conductive hydrophilic materials such as tin oxide and zinc oxide can be used instead of carbon.

The pastes of the layers 231, 232, and 233 constituting the intermediate layer 230 such as described above are stacked on the second layer 24 sequentially in an order starting from the 3-2 layer, and are dried to form the three-layer structure shown in FIG. 5.

In the example of FIG. 5, the reaction layer 11 on the side of the hydrogen electrode 10 uses Ketjenblack EC600JD as a support, and Pt as a catalyst supported on the support at 60 wt %. For the electrolyte, a 5 wt % solution of Nafion is used. The weight ratio of the carbon support to the electrolyte is 1:1.

Figure 6:
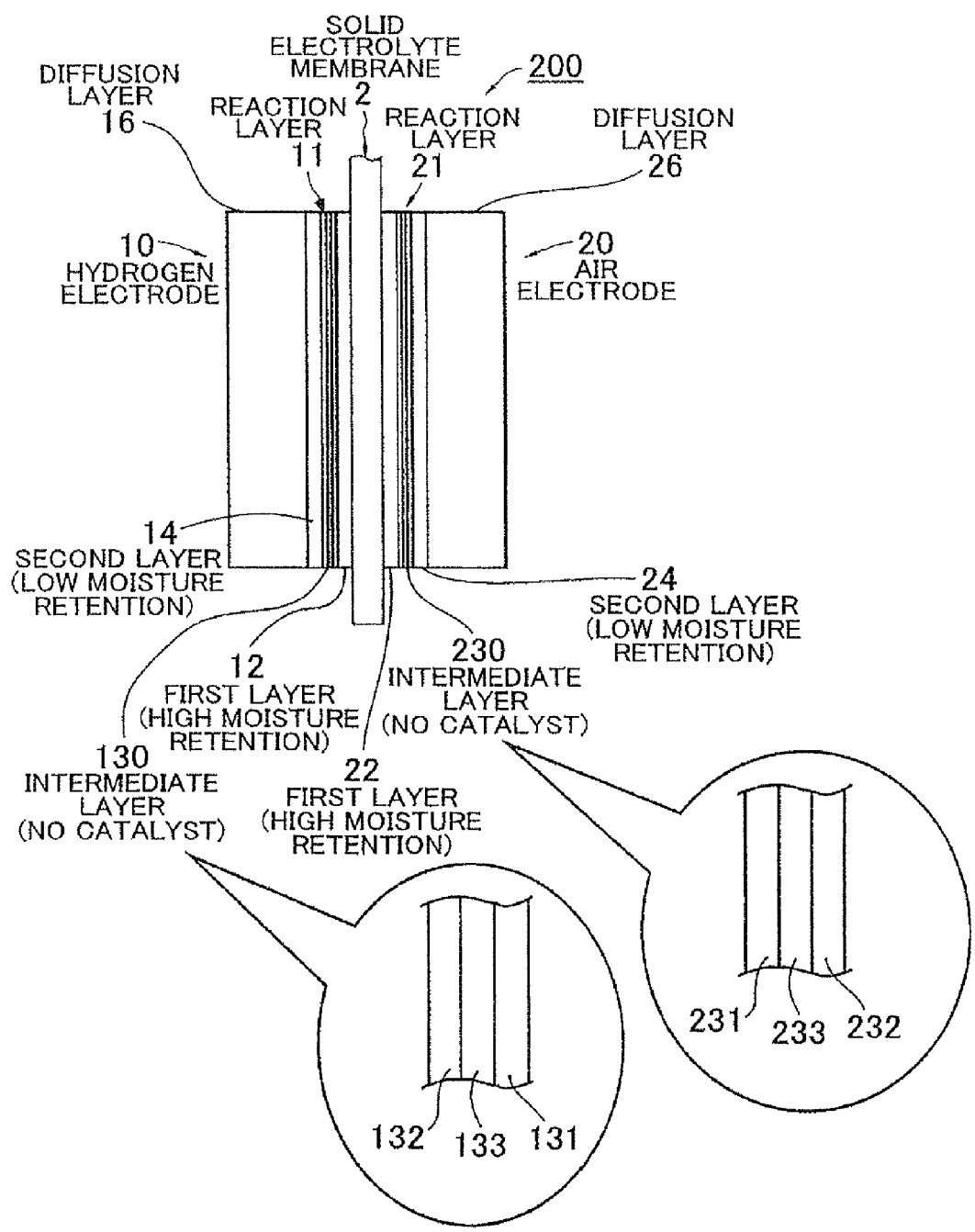
FIG. 6 is a conceptual diagram showing a configuration of a fuel cell 200 of a third example.

FIG. 6 shows a fuel cell 200 of another example 3. Note that the same reference numerals are assigned to the same elements as those of FIG. 5, and descriptions thereof will be omitted.

In the fuel cell 200, the reaction layer 11 on the side of the hydrogen electrode 10 is configured such that a second layer 14 having a low moisture retention capacity, an intermediate layer 130, and a first layer 12 having a high moisture retention capacity are stacked from the side of the diffusion layer 16. Here, the intermediate layer 130 is further formed to have a three-layer structure. That is, the intermediate layer 130 is composed of a 3-1 layer 131 that is connected to the first layer 12 having a high moisture retention capacity, a 3-2 layer 132 that is connected to the second layer 14 having a low moisture retention capacity, and a 3-3 layer 133 that is sandwiched between the 3-1 layer 131 and the 3-2 layer 132.

In the reaction layer 11 on the hydrogen electrode side, the first layer 12 is configured as follows. Ketjenblack EC600JD (registered trademark of Ketjen Black International Company; hereinafter the same shall apply) is used as a support, and Pt as a catalyst is supported on the support at 60 wt %. For the electrolyte, a 5 wt % solution of Nation is used. The weight ratio of the carbon support to the electrolyte is 1:1.

For the paste for the second layer 14, Ketjenblack EC600JD is used and a Pt catalyst is supported thereon at 40 wt %. For the electrolyte, a 5 wt % solution of Nafion is used. The weight ratio of the carbon support to the electrolyte is 1:0.8.

The intermediate layer 130 is configured as follows.

The 3-1 layer 131 is the same as the first layer 12 except that the 3-1 layer 131 has no catalyst. That is, Ketjenblack EC600JD is mixed with Nafion serving as an electrolyte, and the weight ratio of carbon to the electrolyte is 1:1. Accordingly, the 3-1 layer 131 has almost the same moisture retention capacity as that of the first layer 12.

The 3-2 layer 132 is the same as the second layer 14 except that the 3-2 layer 132 has no catalyst. That is, Ketjenblack EC600JD is mixed with Nation serving as an electrolyte, and the weight ratio of carbon to the electrolyte is 1:0.8. Accordingly, the 3-2 layer 132 has almost the same moisture retention capacity as that of the second layer 14.

The 3-3 layer 133 has a higher moisture retention capacity than those of the 3-1 layer 131 and the 3-2 layer 132. Specifically, Ketjenblack EC600JD is mixed with titanium oxide and further with Nation serving as an electrolyte, and the weight ratio of carbon to the electrolyte is 1:1.1.

The pastes of the layers 131, 132, and 133 constituting the intermediate layer 130 such as described above are stacked on the second layer 14 sequentially in an order starting from the 3-2 layer, and are dried to form the three-layer structure shown in FIG. 6.

As a method to increase the moisture retention capacity of the layer that has no catalyst, it is possible to use a method in which carbon is subjected to a heat treatment or an acid treatment so that the surface thereof is oxidized to be hydrophilic, instead of using the above-mentioned method in which hydrophilic material such as titanium oxide or silica gel is mixed. Moreover, the oxidation-treated carbon may be mixed with hydrophilic material. Furthermore, electrically conductive hydrophilic materials such as tin oxide and zinc oxide may be used instead of carbon.

Figure 7:
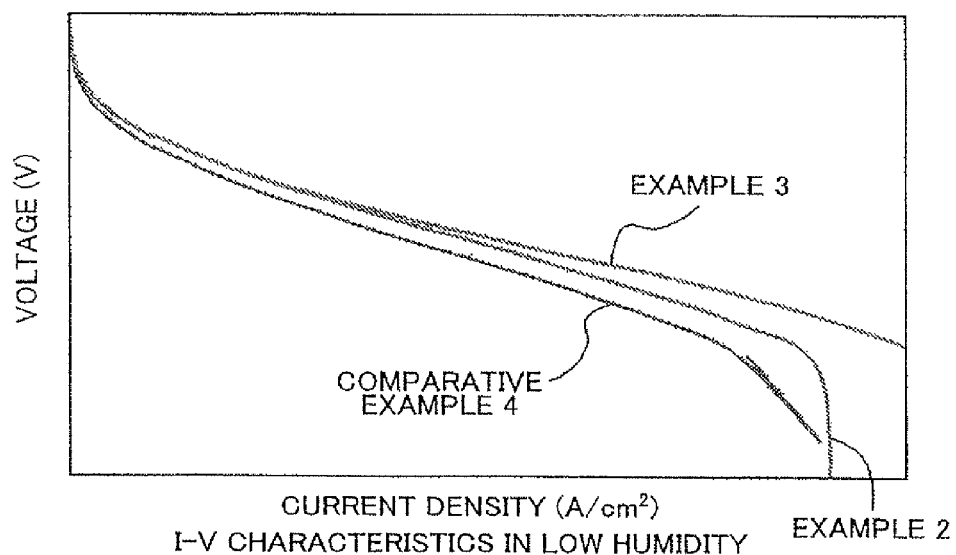
FIG. 7 shows operating characteristics of the fuel cells 100 and 200 of the second and the third examples under the low humidified environment.
Figure 8:
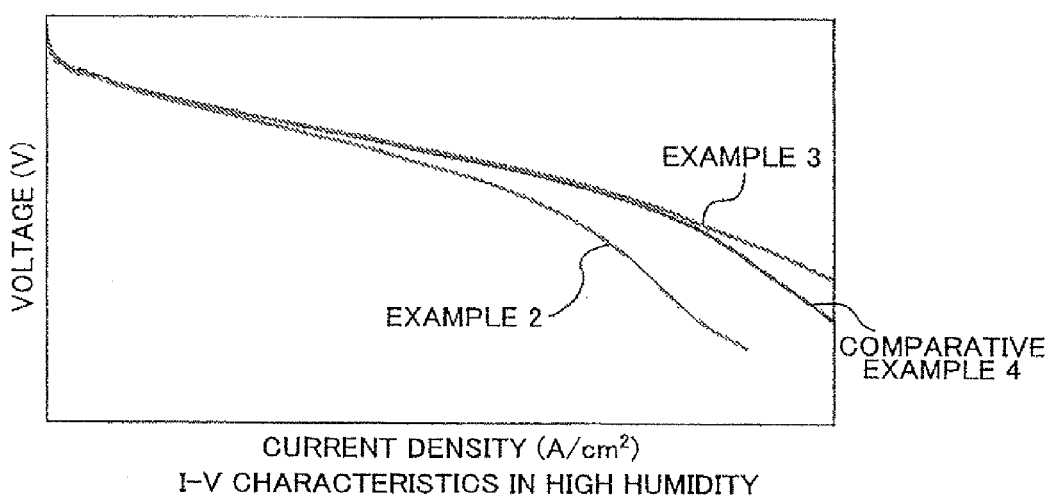
FIG. 8 shows the operating characteristics of the fuel cells 100 and 200 of the second and the third examples under the highly humidified environment.

FIG. 7 shows output properties of the fuel cell 100 of the example 2 shown in FIG. 5 and the fuel cell 200 of the example 3 shown in FIG. 6, both of which being obtained under the low humidified environment. In the same manner, FIG. 8 shows the output properties under the highly humidified environment. A comparative example 4 in FIGS. 7 and 8 is an example in which, in the fuel cell of the example 3, the reaction layers 11 and 21 of the hydrogen electrode 10 and the air electrode 20, respectively, are entirely formed of the second layers 14 and 24, respectively, that have a low moisture retention capacity.

From the results of FIGS. 7 and 8, it can be confirmed that the output property of the fuel cell is improved by making the intermediate layer have the three-layer structure, particularly under the low humidified environment. Particularly, under both the low humidified environment and the highly humidified environment, the excellent output property is exhibited by the example 3 of FIG. 6 in which each of the reaction layers of the air electrode and the hydrogen electrode is provided with the intermediate layer, which has the three-layer structure.

In the example described above, the first layer, the intermediate layer, and the second layer are sequentially formed over the whole area of each of the reaction layers 11 and 21. However, such a configuration may be employed only in a partial area in the planar direction of the reaction layer.

When viewed from a different point of view, the present invention can be understood as a reaction layer for a fuel cell in which a catalyst-free layer is interposed in the direction of thickness of the reaction layer.

In order to control the moisture retention capacity of each of the layers, it is suitable to adjust the porosity ratio of the support.

In order to increase the porosity ratio to reduce the moisture retention capacity of a layer, the following methods are exemplified: to dilute the paste with water or alcohol and apply it onto the diffusion layer; to reduce the ratio of electrolyte to support; to increase the catalyst supporting density; and to use freeze-drying.

In addition, the porosity ratio of an entire layer can be increased by crushing the catalyst into small pieces.

Next, an example corresponding to the other aspect 1-1 of the present invention will be described.

A reaction layer of the present example has the same structure as that of FIG. 1.

The reaction layer 21 of the present example is formed as follows.

First of all, pastes for the layers 22, 23, and 24 constituting the reaction layer 21 are prepared.

For the paste for the first layer 22, carbon black particles are used as a carbon support, and Pt as a catalyst metal is supported on the support at 50 wt %. For the electrolyte, a 5 wt % solution of Nafion is used. The weight ratio of the carbon support to the electrolyte is 1:1.

For the paste for the intermediate layer 23, carbon black particles are used as a base substance, and dispersed in a 5% solution of Nafion. The weight ratio of the base substance to the electrolyte is 1:1.

For the paste for the second layer 24, carbon black particles are used, and a Pt catalyst is supported thereon at 40 wt %. For the electrolyte, a 5 wt % solution of Nation is used. The weight ratio of the carbon support to the electrolyte is 1:1.

In the above-described preparation, when comparing the first layer 22 with the second layer 24, the first layer 22 has a higher catalyst-supporting ratio than that of the second layer 24. The support in the intermediate layer 23 has a smaller average opening diameter of pores than those of the first and the second layers 22 and 24. Because of this point, the intermediate layer 23 has higher water repellency than that of the first and the second layers 22 and 24. In addition, the intermediate layer 23 has a larger specific surface area than those of the first and the second layers 22 and 24, while, the blending ratio of the support to the electrolyte is maintained at the same level among the first and the second layers 22 and 24, and the intermediate layer 23. Also because of these points, the intermediate layer 23 has higher water repellency than that of the first and the second layers 22 and 24.

The pastes are stacked on the surface of the diffusion layer 26 sequentially in an order starting from the paste for the second layer 24, and are dried to form the reaction layer 21 shown in FIG. 1.

In the same manner, on the side of the hydrogen electrode 10 as well, the reaction layer 11 is stacked on the surface of the diffusion layer 16.

The reaction layers 11 and 21 of the hydrogen electrode 10 and the air electrode 20, respectively, are laminated on the solid electrolyte membrane 2 to form the fuel cell 1 of FIG. 1.

In the example described above, the first layer, the intermediate layer, and the second layer are sequentially formed over the whole area of the reaction layer 21. However, such a configuration may be employed only in a partial area in the planar direction of the reaction layer 21.

When viewed from a different point of view, the present invention can be understood as a reaction layer for a fuel cell in which a catalyst-free layer is interposed in the direction of thickness of the reaction layer whose catalyst-supporting ratio is uneven in the direction of thickness thereof.

An example corresponding to the other aspect 2-1 of the present invention will be described.

A reaction layer of the present example has the same structure as that of FIG. 1.

The reaction layer 21 of the present example is formed as follows.

First of all, pastes for the layers 22, 23, and 24 constituting the reaction layer 21 are prepared.

For the paste for the first layer 22, diamond-like carbon particles are used as a support, and Ft as a catalyst metal is supported on the support at 50 wt %. For the electrolyte, a 5 wt % solution of Nafion is used. The weight ratio of the carbon support to the electrolyte is 1:1.

For the paste for the intermediate layer 23, carbon black particles are used as a base material, and dispersed in a 5% solution of Nafion. The weight ratio of the base material to the electrolyte is 1:1.

For the paste for the second layer 24, carbon black particles are used, and a Pt catalyst is supported thereon at 40 wt %. For the electrolyte, a 5 wt % solution of Nation is used. The weight ratio of the carbon support to the electrolyte is 1:1.

In the above-described preparation, when comparing the first layer 22 with the second layer 24, the first layer 22 has a higher catalyst-supporting ratio than that of the second layer 24. Therefore, the first layer 22 has a higher moisture retention capacity than that of the second layer 24.

The support in the intermediate layer 23 has a smaller average opening diameter of pores than those of the first and the second layers 22 and 24. Because of this point, the intermediate layer 23 has higher water repellency than that of the first and the second layers 22 and 24. In addition, the intermediate layer 23 has a larger specific surface area than those of the first and the second layers 22 and 24, while the blending ratio of the support to the electrolyte is maintained at the same level among the first and the second layers 22 and 24, and the intermediate layer 23. Also because of these points, the intermediate layer 23 has higher water repellency than that of the first and the second layers 22 and 24.

The pastes are stacked on the surface of the diffusion layer 26 sequentially in an order starting from the paste for the second layer 24, and are dried to form the reaction layer 21 shown in FIG. 1.

In the same manner, on the side of the hydrogen electrode 10 as well, the reaction layer 11 is stacked on the surface of the diffusion layer 16.

The reaction layers 11 and 21 of the hydrogen electrode 10 and the air electrode 20, respectively, are laminated on the solid electrolyte membrane 2 to form in the fuel cell 1 of FIG. 1.

An example corresponding to the other aspect 3-1 of the present invention will be described.

A reaction layer of the present example has the same structure as that of FIG. 1.

The reaction layer 21 of the present example is formed as follows.

For the paste for the first layer 22, Ketjenblack EC600JD (registered trademark of Ketjen Black International Company; hereinafter the same shall apply) is used as a support, and a Pt—Co alloy as a catalyst is supported on the support at 50 wt %. Note that the molar ratio of Pt to Co is 1:3. For the electrolyte, a 5 wt % solution of Nafion is used. The weight ratio of the carbon support to the electrolyte is 1:1.

For the paste for the intermediate layer 23, carbon black particles are used as a base substance, and dispersed in a 5% solution of Nafion. The weight ratio of the base substance to the electrolyte is 1:1.

For the paste for the second layer 24, Ketjenblack EC600JD is used and a Pt catalyst is supported thereon at 60 wt %. For the electrolyte, a 5 wt % solution of Nafion is used. The weight ratio of the carbon support to the electrolyte is 1:0.8.

In the above-described preparation, when comparing the first layer 22 with the second layer 24, the catalyst in the first layer 22 has a higher moisture retention capacity than that of the catalyst in the second layer 24. The blending ratio of the electrolyte to the base material is higher in the first layer 22 than in the second layer 24.

The support in the intermediate layer 23 has a smaller average opening diameter of pores than those of the first and the second layers 22 and 24. Because of this point, the intermediate layer 23 has higher water repellency than that of the first and the second layers 22 and 24. In addition, the intermediate layer 23 has a larger specific surface area than those of the first and the second layers 22 and 24, while the blending ratio of the support to the electrolyte is maintained at the same level among the first and the second layers 22 and 24, and the intermediate layer 23. Also because of these points, the intermediate layer 23 has higher water repellency than that of the first and the second layers 22 and 24.

The pastes are stacked on the surface of the diffusion layer 26 sequentially in an order starting from the paste for the second layer 24, and are dried to form the reaction layer 21 shown in FIG. 1.

In the same manner, on the side of the hydrogen electrode 10 as well, the reaction layer 11 is stacked on the surface of the diffusion layer 16.

The reaction layers 11 and 21 of the hydrogen electrode 10 and the air electrode 20, respectively, are laminated on the solid electrolyte membrane 2 to form the fuel cell 1 of FIG. 1.

In order to control the moisture retention capacity of each of the layers, it is suitable to adjust the porosity ratio of the support.

In order to increase the porosity ratio to reduce the moisture retention capacity of a layer, the following methods are exemplified: to dilute the paste with water or alcohol and apply it onto the diffusion layer; and to reduce the ratio of electrolyte to support.

In the example described above, the first layer, the intermediate layer, and the second layer are sequentially formed over the whole area of the reaction layer 21. However, such a configuration may be employed only in a partial area in the planar direction of the reaction layer.

When viewed from a different point of view, the present invention can be understood as a reaction layer for a fuel cell in which a highly water-repellent catalyst-free layer is disposed inside the reaction layer in the direction of thickness of the reaction layer whose moisture retention capacity is uneven in the direction of thickness.

The present invention is not limited to any of the above descriptions of the embodiment and the examples of the present invention. Various modifications are also included in the present invention within the scope that does not depart from the description of the claims and that can be easily contrived by those skilled in the art.

DESCRIPTION OF THE REFERENCE NUMERALS 1, 100, 200 Fuel cell
2 Solid electrolyte membrane
10 Hydrogen electrode
11 Reaction layer
16 Diffusion layer
20 Air electrode
21 Reaction layer
12, 22 First layer
130, 230 Intermediate layer
14, 24 Second layer

The invention claimed is:

1. A reaction layer for a fuel cell, which is interposed between a solid electrolyte membrane and a diffusion layer in the fuel cell, the reaction layer comprising:
 a first layer that is in contact with the solid electrolyte membrane;
 a second layer that is in contact with the diffusion layer; and
 an intermediate layer that is interposed between the first layer and the second layer,
 wherein the first layer and the second layer have a catalyst supported by an electrically conductive support,
 wherein the moisture retention capacity of the first layer is higher than the moisture retention capacity of the second layer,
 wherein the intermediate layer comprises an electrically conductive support and an electrolyte, and does not include the catalyst, and said intermediate layer having a moisture retention capacity lower than a moisture retention capacity of the first layer and higher than a moisture retention capacity of the second layer, and
 wherein the intermediate layer further includes a 3-1 layer that is in contact with the first layer, a 3-2 layer that is in contact with the second layer, and a 3-3 layer that is sandwiched between the 3-1 layer and the 3-2 layer, wherein the 3-1 layer has a moisture retention capacity equal to or lower than the moisture retention capacity of the first layer and higher than a moisture retention capacity of the 3-2 layer, the moisture retention capacity of the 3-2 layer is equal to or higher than the moisture retention capacity of the second layer, and the 3-3 layer has a moisture retention capacity higher than the moisture retention capacities of the 3-1 layer and the 3-2 layer.

2. A reaction layer for a fuel cell, which is interposed between a solid electrolyte membrane and a diffusion layer in the fuel cell, the reaction layer comprising:
a first layer that is in contact with the solid electrolyte membrane;
a second layer that is in contact with the diffusion layer; and
an intermediate layer that is interposed between the first layer and the second layer,
wherein the first layer and the second layer have a catalyst supported by an electrically conductive support,
wherein the moisture retention capacity of the first layer is higher than the moisture retention capacity of the second layer,
wherein the intermediate layer comprises an electrically conductive support and an electrolyte, and does not include the catalyst, and said intermediate layer having a moisture retention capacity lower than a moisture retention capacity of the first layer and higher than a moisture retention capacity of the second layer,
wherein the intermediate layer further includes a 3-1 layer that is in contact with the first layer, a 3-2 layer that is in contact with the second layer, and a 3-3 layer that is sandwiched between the 3-1 layer and the 3-2 layer, wherein the 3-1 layer has a moisture retention capacity equal to or lower than the moisture retention capacity of the first layer and higher than a moisture retention capacity of the 3-2 layer, the moisture retention capacity of the 3-2 layer is equal to or higher than the moisture retention capacity of the second layer, and the 3-3 layer has a moisture retention capacity higher than the moisture retention capacities of the 3-1 layer and the 3-2 layer, and
wherein the 3-1 layer has the same properties as properties of the first layer except that the 3-1 layer has no catalyst, and the 3-2 layer has the same properties as properties of the second layer except that the 3-2 layer has no catalyst.

3. A reaction layer for a fuel cell, which is interposed between a solid electrolyte membrane and a diffusion layer in the fuel cell, the reaction layer comprising:
a first layer that is in contact with the solid electrolyte membrane;
a second layer that is in contact with the diffusion layer; and
an intermediate layer that is interposed between the first layer and the second layer,
wherein the first layer and the second layer have a catalyst supported by an electrically conductive support,
wherein the moisture retention capacity of the first layer is higher than the moisture retention capacity of the second layer,
wherein the intermediate layer comprises an electrically conductive support and an electrolyte, and does not include the catalyst, and said intermediate layer having a moisture retention capacity lower than a moisture retention capacity of the first layer and higher than a moisture retention capacity of the second layer,
wherein the intermediate layer further includes a 3-1 layer that is in contact with the first layer, a 3-2 layer that is in contact with the second layer, and a 3-3 layer that is sandwiched between the 3-1 layer and the 3-2 layer, wherein the 3-1 layer has a moisture retention capacity equal to or lower than the moisture retention capacity of the first layer and higher than a moisture retention capacity of the 3-2 layer, the moisture retention capacity of the 3-2 layer is equal to or higher than the moisture retention capacity of the second layer, and the 3-3 layer has a moisture retention capacity higher than the moisture retention capacities of the 3-1 layer and the 3-2 layer, and
wherein the first layer has a lower porosity ratio of the support, a higher ratio of an electrolyte, or a lower equivalent weight (EW) of the electrolyte, compared with the second layer.

* * * * *